(12) United States Patent
Yavo et al.

(10) Patent No.: US 11,562,068 B2
(45) Date of Patent: Jan. 24, 2023

(54) PERFORMING THREAT DETECTION BY SYNERGISTICALLY COMBINING RESULTS OF STATIC FILE ANALYSIS AND BEHAVIOR ANALYSIS

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 532 days.

(21) Appl. No.: 16/732,270

(22) Filed: Dec. 31, 2019

(65) Prior Publication Data

US 2021/0200870 A1 Jul. 1, 2021

(51) Int. Cl.
*G06F 21/56* (2013.01)
*H04L 9/40* (2022.01)
*G06N 20/00* (2019.01)
*G06N 5/04* (2006.01)

(52) U.S. Cl.
CPC .......... *G06F 21/565* (2013.01); *G06F 21/566* (2013.01); *G06N 5/04* (2013.01); *G06N 20/00* (2019.01); *H04L 63/145* (2013.01); *H04L 63/1416* (2013.01); *H04L 63/1425* (2013.01); *H04L 63/20* (2013.01)

(58) Field of Classification Search
USPC .................................................... 726/22–25
See application file for complete search history.

(56) References Cited

U.S. PATENT DOCUMENTS

| | | | | |
|---|---|---|---|---|
| 8,701,192 B1 * | 4/2014 | Glick | .................... | G06F 21/566 726/24 |
| 8,726,392 B1 * | 5/2014 | McCorkendale | ....... | G06F 21/52 713/188 |
| 9,432,389 B1 * | 8/2016 | Khalid | ................ | H04L 63/1425 |
| 10,038,707 B2 * | 7/2018 | Muddu | ............ | G06F 16/24578 |
| 10,122,742 B1 * | 11/2018 | Oprea | .................... | G06F 16/285 |
| 10,462,173 B1 * | 10/2019 | Aziz | ..................... | G06F 21/566 |

(Continued)

OTHER PUBLICATIONS

Damodaran et al.; A comparison of static, dynamic, and hybrid analysis for malware detection; springer (Year: 2015).*

(Continued)

*Primary Examiner* — Kambiz Zand
*Assistant Examiner* — Mahabub S Ahmed
(74) *Attorney, Agent, or Firm* — HDC Intellectual Property Law, LLP (57) ABSTRACT

Systems and methods are described for synergistically combining static file based detection and behavioral analysis to improve both threat detection time and accuracy. An endpoint security solution running on an endpoint device generates a static analysis score by performing a static file analysis on files associated with a process initiated on the endpoint device. When the static analysis score meets or exceeds a static analysis threshold, then a network security platform treats the process as malicious and blocks execution of the process. When the static analysis score is less than the static analysis threshold, then the endpoint security solution obtains a dynamic analysis score for the process. The network security platform treats the process as malicious and causes execution of the process to be blocked based on a function of the static analysis score and the dynamic analysis score.

20 Claims, 7 Drawing Sheets

(56) References Cited

U.S. PATENT DOCUMENTS

| | | | | |
|---|---|---|---|---|
| 10,515,214 B1* | 12/2019 | Vincent | | G06F 21/562 |
| 10,581,879 B1* | 3/2020 | Paithane | | G06F 21/566 |
| 10,893,059 B1* | 1/2021 | Aziz | | G06F 21/53 |
| 11,240,262 B1* | 2/2022 | Aziz | | H04L 63/1433 |
| 2010/0125911 A1* | 5/2010 | Bhaskaran | | G06Q 10/10 |
| | | | | 715/781 |
| 2013/0117855 A1* | 5/2013 | Kim | | G06F 21/566 |
| | | | | 726/24 |
| 2013/0298230 A1* | 11/2013 | Kumar | | G06F 21/51 |
| | | | | 726/22 |
| 2014/0359777 A1* | 12/2014 | Lam | | G06F 21/577 |
| | | | | 726/25 |
| 2015/0096022 A1* | 4/2015 | Vincent | | G06F 21/562 |
| | | | | 726/23 |
| 2015/0281260 A1* | 10/2015 | Arcamone | | H04L 63/1425 |
| | | | | 726/11 |
| 2016/0226903 A1* | 8/2016 | Arcamone | | H04L 63/1425 |
| 2016/0226905 A1* | 8/2016 | Baikalov | | H04L 63/1433 |
| 2017/0061126 A1* | 3/2017 | Hooks | | H04L 63/1416 |
| 2017/0063894 A1* | 3/2017 | Muddu | | H04L 43/08 |
| 2017/0063912 A1* | 3/2017 | Muddu | | H04L 43/045 |
| 2017/0126710 A1* | 5/2017 | De-Levie | | H04L 63/1425 |
| 2017/0134415 A1* | 5/2017 | Muddu | | G06F 3/0484 |
| 2017/0148124 A1* | 5/2017 | Johnston | | G06Q 50/265 |
| 2017/0244737 A1* | 8/2017 | Kuperman | | H04L 63/1425 |
| 2018/0288077 A1* | 10/2018 | Siddiqui | | H04L 63/20 |
| 2018/0336353 A1* | 11/2018 | Manadhata | | G06F 16/3334 |
| 2019/0005423 A1* | 1/2019 | Pritzkau | | G06Q 10/0635 |
| 2019/0081967 A1* | 3/2019 | Balabine | | H04L 67/535 |
| 2019/0319987 A1* | 10/2019 | Levy | | H04L 63/083 |
| 2020/0175152 A1* | 6/2020 | Xu | | G06F 21/56 |
| 2020/0218802 A1* | 7/2020 | Davis | | G06F 21/554 |
| 2020/0351298 A1* | 11/2020 | Paturi | | H04L 67/1095 |
| 2021/0272473 A1* | 9/2021 | Boskovic | | G06F 21/577 |
| 2022/0035927 A1* | 2/2022 | Lysecky | | G06F 21/577 |

OTHER PUBLICATIONS

Lindorfer et al.; Marvin: Efficient and Comprehensive Mobile App Classification Through Static and Dynamic Analysis; IEEE (Year: 2015).*

* cited by examiner

PERFORMING THREAT DETECTION BY SYNERGISTICALLY COMBINING RESULTS OF STATIC FILE ANALYSIS AND BEHAVIOR ANALYSIS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2019, Fortinet, Inc.

BACKGROUND

Field

Embodiments of the present invention generally relate to network security and threat detection. In particular, embodiments of the present invention relate to use of a combination of static file analysis and behavioral analysis to more accurately and effectively perform threat detection.

Description of the Related Art

Static file detection using machine learning or otherwise is effective in detection of unknown threats; however, it is more false-positive prone than signature based detection. Thus, a minimum static detection score threshold is typically used to keep the detection and false positive rate balanced.

A similar issue exists when it comes to behavioral detection of threats by observing (for example, using sandbox analysis and/or endpoint detection and response (EDR) analysis) how one or more processes associated with a file behave. Some actions undertaken by a particular process as it is being monitored in real-time seem highly suspicious. As such, generating a security event regarding a threat based on individual actions can lead to a high false positive rate. For example, the act of reading memory of a sensitive process, on its own, may appear malicious. One way to mitigate creating a high false positive rate is to collect more behavioral indicators so as to facilitate a more accurate determination regarding malicious intent. The downside, however, is that in order to obtain sufficient behavior indicators (so as to reduce false positives) the malware is executed longer.

SUMMARY

Systems and methods are described for synergistically combining static file based detection and behavioral analysis to improve both threat detection time and accuracy. According to one embodiment, a network security platform protecting a private network maintains information regarding a static analysis threshold and a mapping of behaviors to corresponding weighting factors. The network security platform includes an endpoint security solution. The static analysis threshold specifies a threshold for a particular process to be considered malicious when compared to a particular score assigned to the particular process as a result of performing static file analysis on files associated with the particular process and the weighting factors are indicative of a significance of the corresponding behavior to an inference of malicious intent. In response to an attempt to execute a process on an endpoint device and prior to permitting execution of the process on the endpoint device, the endpoint security solution running on the endpoint device generates a static analysis score by performing a static file analysis on files associated with the process. When the static analysis score meets or exceeds the static analysis threshold, then the network security platform treats the process as malicious and blocks execution of the process. When the static analysis score is less than the static analysis threshold, then the endpoint security solution obtains a dynamic analysis score for the process by letting the process execute and monitoring its behavior in real-time. The network security platform treats the process as malicious and causes execution of the process to be blocked based on a function of the static analysis score and the dynamic analysis score which is calculated in real-time. Thus, allowing the user to work with no interruptions while maintaining low false-positive rate and highly-effective malware prevention.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for synergistically combining static file based detection and behavioral analysis to improve both threat detection time and accuracy in real-time. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrases "endpoint protection platform" or "endpoint security solution" generally refer to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and may leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the Software as a Service (SaaS) enSilo Endpoint Security Platform and the FORTICLIENT integrated endpoint protection platform available from Fortinet, Inc. of Sunnyvale, Calif.

The term "event" generally refers to an action or behavior of a process, for example, running on an endpoint device. Non-limiting examples of events include file system events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (a/k/a key logging), an attempt capture a screen shot, an attempt to record sounds, and/or other behaviors or actions that may be similar to processes or programs known to be malicious. In one embodiment, events may be detected or intercepted by the endpoint protection platform hooking file system and/or operating system application programming interface (API) calls of interest and/or by leveraging a hypervisor to monitor the operating system.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), behavioral or dynamic analysis (e.g., the FORTISANDBOX family of sandbox appliances, or FortiEDR), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "network security device" or "security device" generally refer to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, sandbox appliances, VPN appliances, gateways, UTM appliances and the like.

The phrase "security event classification source" generally refers to a security service in the form of hardware, software or a combination thereof that is capable of contributing in whole or in part to a classification result for a given security event (e.g., as malicious, suspicious, a potentially unwanted program (PUP), inconclusive, likely safe or safe). Non-limiting examples of security event classification sources include various types of endpoint protection platforms/solutions, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning classifiers, file threat-feeds, Internet Protocol (IP)/uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, EDR data, and the like. In one embodiment, some security event classification sources may be limited to classifying one or more specific artifacts of a given security event, while others may be capable of independently classifying a given security event and producing a classification result. For example, a hash feed that generates a hash of a file associated with an event may be capable of classifying the file and an IP or URL feed (e.g., an IP/URL threat feed or an IP/URL reputation service) may be capable of classifying an IP address or a URL associated with an event.

The phrase "network security platform" generally refers to one or more security event detection and/or classification sources that are used to protect a private network. The security event detection and/or classification sources of a network security platform may have knowledge of each other, communicate with each other, cooperate with each other to facilitate classification of observed security events and otherwise create synergies and improve the overall protection provided to the private network against cybersecurity threats. Alternatively or additionally, the security event classification sources participating within a network security platform may be under common control of a management service or device. A network security platform may include security event classification sources from the same or different parties (e.g., manufacturers and/or service providers) and the participating security event classification sources may reside or operate within different computing environments. For example, some of the participating security event classification sources may be implemented in physical form as part of an on premises solution and others may be implemented as services or in virtual form within a cloud-based environment (e.g., a cloud-based security service (e.g., the enSilo Cloud Service or FORTIGUARD security services available from the assignee of the present invention) or within a third-party cloud provider). Non-limiting examples of a network security platform include one or more network security devices and/or endpoint protection platforms that are part of a cooperative security fabric (e.g., the Fortinet Security Fabric) and one or more network security services implemented within a cloud-based security service or other public, private or hybrid cloud environment. While in the context of various examples described herein, for sake of simplicity and brevity, a network security platform is described as including an endpoint protection platform running on an endpoint device of a private network, those skilled in the art will appreciate embodiments of the present invention are applicable to network security platforms including and a sandbox service and/or different security event detection/classification sources.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments. Numerous modifications, changes, variations, substitutions, and equivalents will be apparent to those skilled in the art, without departing from the spirit and scope of the invention, as described in the claims.

According to one embodiment, a network security platform protecting a private network maintains information regarding a static analysis threshold and a mapping of behaviors to corresponding weighting factors. The network security platform includes an endpoint security solution. The static analysis threshold specifies a threshold for a particular process to be considered malicious when compared to a particular score assigned to the particular process as a result of performing static file analysis on files associated with the particular process and the weighting factors are indicative of a significance of the corresponding behavior to an inference of malicious intent. In response to an attempt to execute a process on an endpoint device and prior to permitting execution of the process on the endpoint device, the endpoint security solution running on the endpoint device generates a static analysis score by performing a static file analysis on files associated with the process. When the static analysis score meets or exceeds the static analysis threshold, then the network security platform treats the process as malicious and blocks execution of the process. In one embodiment, the static analysis is part of a pre-classification process that forms an initial classification. When the static analysis score is less than the static analysis threshold, then the endpoint security solution generates a dynamic analysis score for the process by observing behaviors resulting from execution of the files by the endpoint device in real-time and determines the corresponding weighting factors of the observed behaviors based on the mapping. In one embodiment, the dynamic analysis is also part of a pre-classification process that contributes to the initial classification made by the endpoint security solution. The network security platform classifies the process as malicious and causes execution of the process to be blocked based on a function of the static analysis score and the dynamic analysis score.

To mitigate issues with static file analysis and behavioral detection (or dynamic analysis), embodiments of the present invention combine both approaches and advantageously reduce false-positives typically associated with using static file analysis alone while also facilitating early and high accuracy detection. According to an implementation, a static file analysis score of every file associated with a process is calculated prior to execution of the process. To reduce false-positives, a relatively high threshold is used to determine if a file should be blocked prior to execution. When the static analysis score is lower than the threshold, dynamic or behavior analysis is further used to determine if the process is malicious. For example, a file with a static analysis score of 55 out of 100 may not be blocked on pre-execution, however, if the file attempts to access sensitive data, the process may be blocked based on dynamic behavior analysis. On the other hand, if a file with a static analysis score of 10 out of 100 accesses the same sensitive data, the process may not be blocked unless more significant anomalous behavior is detected.

Figure 1A:
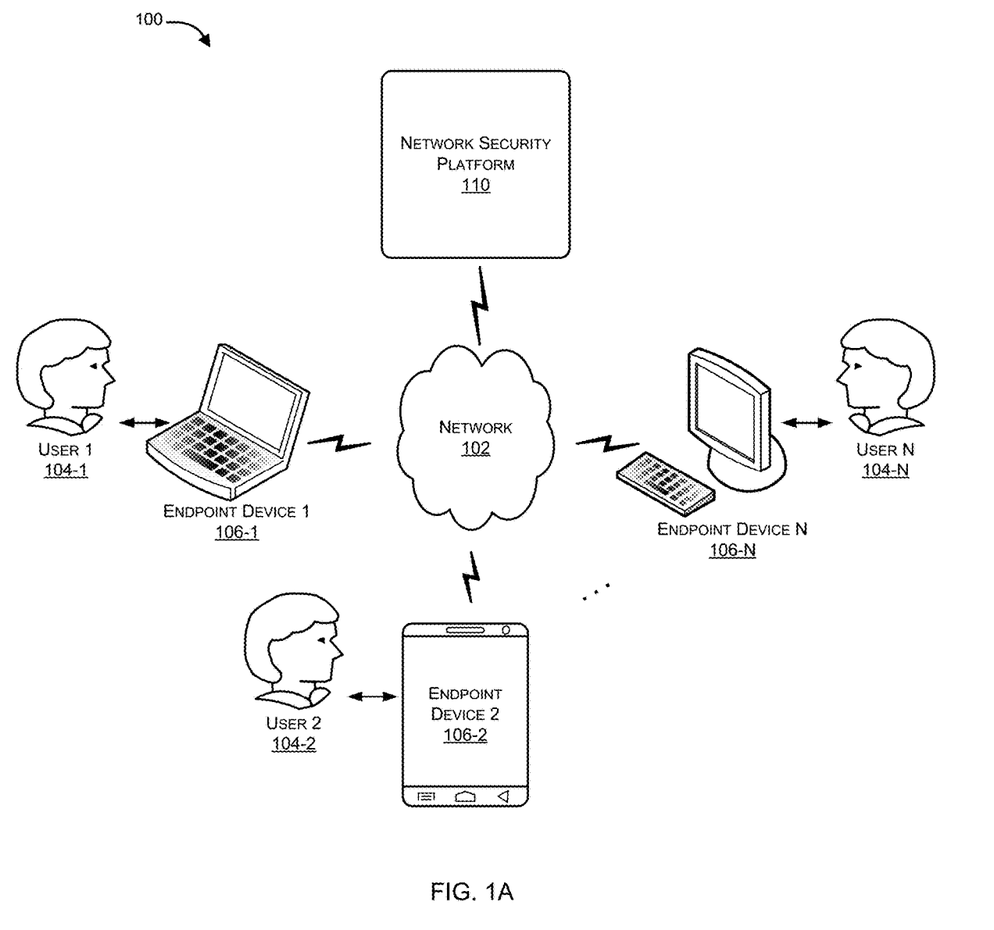
FIG. 1A-B illustrate network architectures in which aspects of the present invention can be implemented in accordance with an embodiment of the present invention.

FIG. 1A illustrates a network architectures 100 in which aspects of the present invention can be implemented in accordance with an embodiment of the present invention. In the context of network architecture 100, a network security platform 110, protecting a private network 102 is accessible to endpoint devices 106-1, 106-2, . . . , 106-N of private network 102. Network security platform 110 may include a cloud-based security service in which a sandbox service resides as well as an endpoint security solution running on the endpoint devices 106. The cloud-based security service may be implemented within a public cloud, a private cloud or a hybrid cloud. Non-limiting examples of a cloud-based security service include the enSilo Cloud Service and FORTIGUARD security services available from assignee of the present invention.

The endpoint devices 106-1, 106-2, 106-3 . . . 106-N (which may be collectively referred to as endpoint devices 106, and may be individually referred to as endpoint device 106 or endpoint device 106 herein) associated with network 102 may include, but are not limited to, personal computers, smart devices, web-enabled devices, hand-held devices, laptops, mobile devices, and the like. In one embodiment, network security platform 110 may interact with users 104-1, 104-2 . . . 104-N (which may be collectively referred to as users 104, and may be individually referred to as a user 104 herein) through network 102 via their respective endpoint devices 106, for example, in the form of notifications or alerts regarding security events via a user interface associated with the endpoint security solution.

Those skilled in the art will appreciate that, network 102 can be a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

As described in further detail below, network security platform 110 can maintain information regarding a static analysis threshold and a mapping of behaviors to corresponding weighting factors, for processing information relating to security of a process observed at an endpoint device 106. When endpoint device 106 attempts to execute the process, prior to permitting execution of the process, an endpoint security solution running on endpoint device 106, performs static analysis on files associated with the process to generate a static analysis score. In one embodiment, the static analysis score is generated by a machine-learning based model that has been trained based on numerous static properties/features associated with files and/or based on heuristic analysis based on signatures and rules. Non-limiting examples of static properties/features of files that may be used include file signature information (if it exists) (e.g., is the signature valid), file entropy, is the file packed (e.g., using the Ultimate Packer for eXecutables (UPX), Thermida or the like), is the file a .NET file, does the file have debugger information associated with it, does the file have common section names, is the file using a known runtime library, is the file checksum correct, does the file entry point point to the code section, the modules that the file depends on, the time the file was compiled, suspicious strings within the file, and suspicious URLs within the file.

The static analysis threshold maintained by network security platform 110 can specify a threshold for a particular process to be considered malicious when compared to a particular score assigned to the particular process as a result of performing static file analysis on files associated with the particular process. Thus, network security platform 110 compares the static analysis score with the static analysis threshold and when the static analysis score meets or exceeds the static analysis threshold, then network security platform 110 treats the process as malicious (e.g., makes an initial classification of the process as malicious) and may take appropriate action to protect the endpoint device 106 (e.g., quarantining the file, notify the administrator, and/or block execution of the process). On the other hand, when the static analysis score is less than the static analysis threshold, the endpoint security solution also makes use of a dynamic analysis score for the process. For example, the endpoint security solution may allow the process to continue to run on the endpoint device 106 and perform local observation regarding behaviors resulting from execution of the files. Based on the observed behaviors performed by the file during execution, the corresponding weighting factors of the observed behaviors may be determined based on the mapping maintained by network security platform 110. The weighting factors may be indicative of the relative significance of the corresponding behaviors to an inference of malicious intent. Finally, network security platform 110 may classify the process (and therefore the file) as malicious and take appropriate action (e.g., blocking execution of the process) based on a function of both the static analysis score and the dynamic analysis score. While the above example is described with reference to both static file analysis and dynamic analysis being performed in real-time by an endpoint security solution running on an endpoint device responsive to an attempt to launch a process, in alternative embodiments, the endpoint security solution may perform the static file analysis and may offload performance of the dynamic analysis by, for example, submitting the file for analysis by a sandbox service implemented by network security platform 110 in the cloud for example at the cost of interrupting the user by halting the execution until dynamic-analysis is done.

Those skilled in the art will appreciate that embodiments of the present invention involve integration of multiple actions performed within network security platform 110, which may include actions within the cloud alone, the endpoint security solution alone or a combination of both. For example, in one embodiment, the endpoint security solution generates both the static analysis score and the dynamic analysis score in real-time and the network security platform 110 determines if the process and/or file is malicious based on the scores. Alternatively, the static analysis may be performed by the endpoint security solution and the dynamic analysis may be performed in a cloud-based security service associate with network security platform 110 by a sandbox service, for example. Such an integrated approach facilitates the reduction of false positives and enhances effectiveness of detection of malicious processes initiated at endpoint devices 106.

Figure 1B:
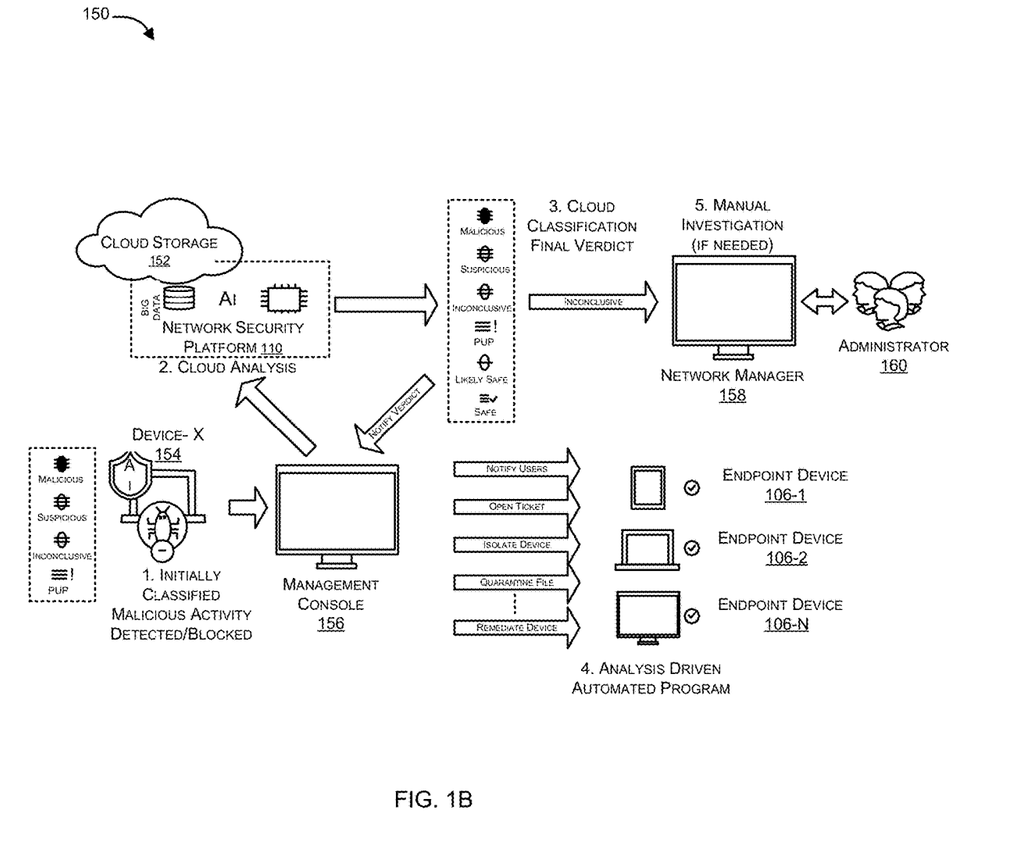

FIG. 1B illustrates a cloud-based network architecture 150 in which aspects of the present invention can be implemented in accordance with an embodiment of the present invention. Referring to architecture 100 and 150, network security platform 110 including a cloud-based security service in which a sandbox resides and cloud storage 152 may maintain information regarding a static analysis threshold and a mapping of behaviors to corresponding weighting factors. The static analysis threshold specifies a threshold for a particular process to be considered malicious when compared to a particular score assigned to the particular process as a result of performing static file analysis on files associated with the particular process, and the weighting factors are indicative of a significance of the corresponding behavior of the to an inference of malicious intent.

In one embodiment, when a process is initiated at endpoint device 106, an endpoint security solution running on endpoint device 106 generates a static analysis score prior to permitting execution of the process on endpoint device 106. Endpoint security solution generates the static analysis score by performing a machine-learning based static file analysis on files associated with the process. For example, the endpoint security solution may use random forest machine learning approach for performing static file analysis. In one implementation, various static properties of the file are analyzed for static file analysis. Examples of static properties may include file signature information (e.g. is file signature valid), file entropy, is file packed (UPX for example), is a .NET file, does the file has debugger information, does the file has common section names, is the file using known runtime library, is the file checksum correct, does the file entry-point points to code section, checking modules that the file depends on, time of compilation of the file, suspicious strings in the file, suspicious URLs of the file, etc.

In an implementation, network security platform 110 treats the process as malicious when the static analysis score meets or exceeds the static analysis threshold and consequently, the endpoint security solution blocks execution of the process and initially classifies the process as malicious. For example, network security platform 110 may initially classify the process as a malicious when the process exhibits an anomaly, which is determined by comparing the static analysis score with the static analysis threshold and as a consequence, the endpoint security solution may block execution of the process.

Alternately, when the static analysis score is less than the static analysis threshold, then the endpoint security solution generates a dynamic analysis score for the process by observing behaviors resulting from execution of the one or more files on the endpoint device in real-time (or causes such a score to be generated by the cloud-based sandbox service at the cost of interrupting the user). As noted above, the corresponding weighting factors of the observed behaviors can be determined based on the mapping maintained by network security platform 110. In one implementation, to generate the dynamic analysis score, the endpoint security solution may request input from network security platform 110 for information regarding the observed behaviors by transmitting contextual information regarding the process to network security service 110. The contextual information can include information indicative of an application with which the process is associated and, information identifying user 104, for example, a command line information (e.g., a command line instruction and/or associated parameters) used to execute the process, an execution chain associated with the process, a memory dump associated with the process, user that executes the command line and environment variables associated with the process.

Network security platform 110 then classifies the process as malicious based on a function of the static analysis score and the dynamic analysis score. After the classification has been achieved, network security platform 110 may then cause the endpoint security solution to block execution of the process and/or take other appropriate action with respect to the process at issue by providing the classification to the endpoint security solution. In some embodiments, the cloud-based security service may also cause the endpoint security solution to perform an automated incident response by providing an output of an automated response engine of network security platform to the endpoint security solution. The automated incident response may be any or a combination of notifying end user 104 of endpoint device 106 regarding the malicious process, notifying network administrator 160 regarding the malicious process, opening a ticket, isolating endpoint device 106, quarantining the files associated with the process, and remediating endpoint device 106. According to one embodiment, an automated incident response engine implemented within network security platform 110 orchestrates incident response operations using tailor made playbooks based on the classification.

Embodiments of the present invention are further explained with reference to the example illustrated by FIG. 1B. In the context of this example, considering a static file analysis is being performed by endpoint security solution running at computing device 154. Network security service 110 may initially classify a process observed at computing device 154 as malicious when a static analysis score generated by the endpoint security solution meets or exceeds a static analysis threshold. At step 1, network security platform 110 causes the endpoint security solution to block execution of the process when the process is initially classified as malicious based on the static analysis score. Network security platform 110 and cloud storage 152 may be managed, configured, monitored and/or operated using a management console 156. When the static analysis score is less than the static analysis threshold, at step 2, the endpoint security solution may interact with network security platform by transmitting contextual information regarding the process to network security platform 110 and generates a dynamic analysis score for the process by observing behaviors resulting from execution of the files by the computing device 156 and determining the corresponding weighting factors of the observed behaviors based on mapping of the behaviors and the weighting factors maintained by network security platform 110.

At step 3, network security platform 110 generates final verdict by classifying the process as malicious based on a function of the static analysis score and the dynamic analysis score. If the process is classified as malicious, network security platform 110 causes the endpoint security solution to block the process. In an example, network security platform 110 can provide the final verdict of a malicious process to a network manager 158 and management console 156.

At step 4, network security platform may cause the endpoint protection solution to perform an automated incident response including any or a combination of notifying the user of the process, isolating the endpoint device associated with the process, quarantining a file associated with the process and remediating anomaly associated with the process. The action can also be notified to all other endpoint devices 106 of network 102. At step 5, when the process is ultimately classified as non-malicious (e.g., any of suspicious or inconclusive), network security platform 110, may trigger a manual investigation by an administrator using a network manager 158. Additionally, when the process is ultimately finally classified as a malicious (e.g. malicious or pup), network security platform 110 may cause the endpoint protection platform to continue to deny further execution of the process by taking an action at issue.

Those skilled in the art will appreciate that the static analysis score is static across execution time, however, for the dynamic score, execution behavior is observed. Static analysis score adds information in relation to how far in its actions malware will be allowed to execute before being blocked during dynamic analysis. For example, if the static analysis score is very low, say 2/100, execution of the process may not be blocked and the network security platform may wait to analyze what happens next. However, if the static analysis score is high, say 65/100, the network security platform may block the process prior to initiating execution of the process.

Figure 2:
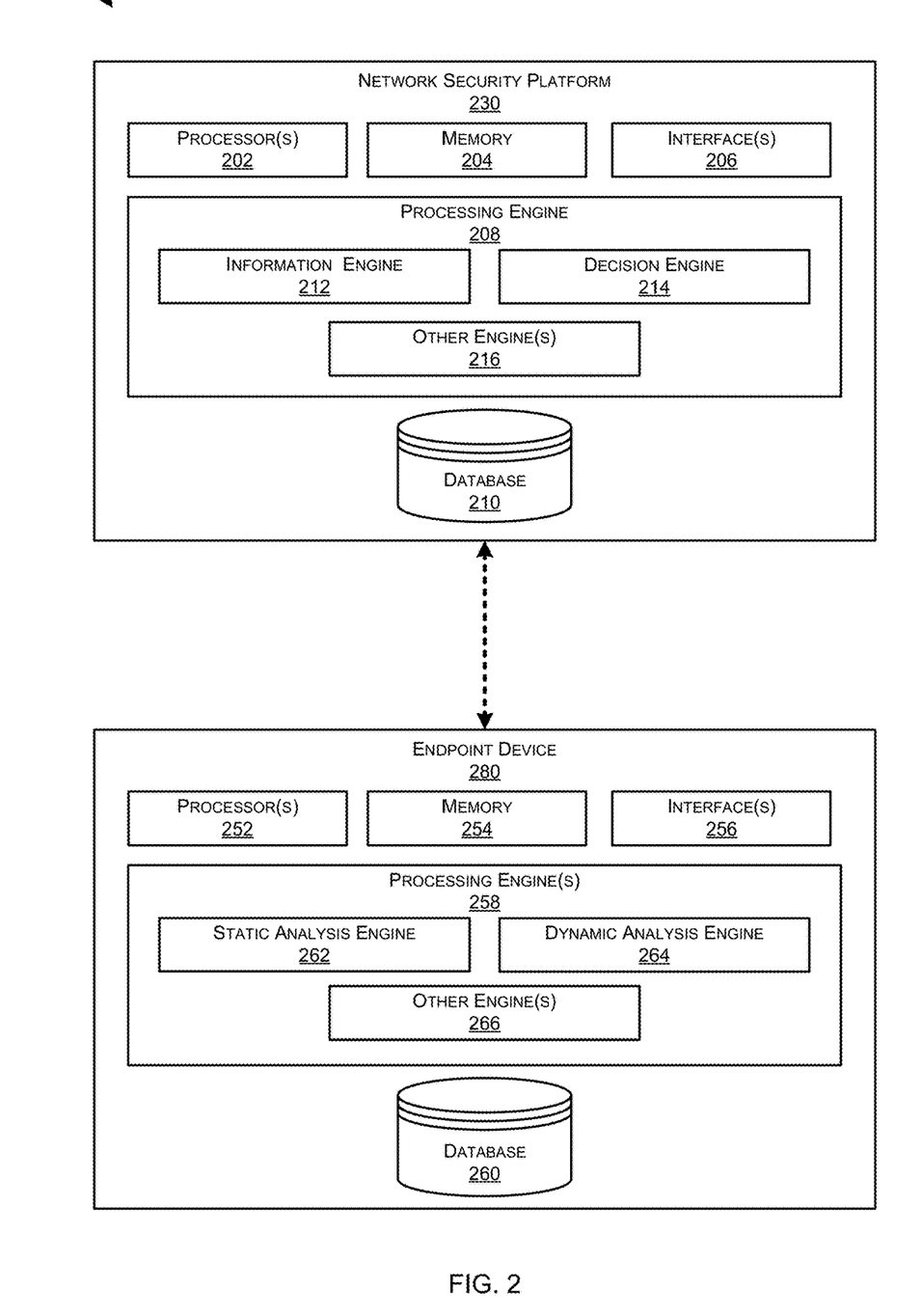
FIG. 2 is a block diagram illustrating functional components of a network security platform and an endpoint device in accordance with an embodiment of the present invention.

FIG. 2 is a block diagram 200 illustrating functional components of a network security platform 230 and an endpoint device 280 in accordance with an embodiment of the present invention. In the context of the present example, network security platform 230 and endpoint device 280, can include one or more processor(s) 202 and 252 respectively. Processor(s) 202 and 252 can be implemented as one or more microprocessors, microcomputers, microcontrollers, digital signal processors, central processing units, logic circuitries, and/or any devices that manipulate data based on operational instructions. Among other capabilities, processor(s) 202 and 252 are configured to fetch and execute computer-readable instructions stored in a memory 204 and 254 respectively. Memory 204 and 254 can store one or more computer-readable instructions or routines, which may be fetched and executed to create or share the data units over a network service. Memory 204 and 254 can include any non-transitory storage device including, for example, volatile memory such as RAM, or non-volatile memory such as EPROM, flash memory, and the like. In an example embodiment, memory 204 and 254 may be a local memory or may be located remotely, such as a server, a file server, a data server, and the Cloud.

Network security platform 230 and endpoint device 280 can also include one or more interface(s) 206 and 256 respectively. Interface(s) 206 and 256 may include a variety of interfaces, for example, interfaces for data input and output devices, referred to as I/O devices, storage devices, and the like to facilitate communication with various devices and functional components.

Processing engine(s) 208 and 258 can be implemented as a combination of hardware and software or firmware programming (for example, programmable instructions) to implement one or more functionalities of processing engine(s) 208 and 258. In the examples described herein, such combinations of hardware and software or firmware programming may be implemented in several different ways. For example, the programming for processing engine(s) 208 and 258 may be processor executable instructions stored on a non-transitory machine-readable storage medium and the hardware for processing engine(s) 208 and 258 may include a processing resource (for example, one or more processors), to execute such instructions. In the examples, the machine-readable storage medium may store instructions that, when executed by the processing resource, implement processing engine(s) 208 and 258. In such examples, network security platform 230 and endpoint device 280 can include the machine-readable storage medium storing the instructions and the processing resource to execute the instructions, or the machine-readable storage medium may be separate but accessible to network security platform 230, endpoint device 280 and the processing resource. In other examples, processing engine(s) 208 and 258 may be implemented by electronic circuitry. Databases 210 and 260 can include data that is either stored or generated as a result of functionalities implemented by any of the components of processing engine(s) 208 and 258 respectively.

In an example, processing engine 208 can include an information engine 212, a decision engine 214, and other engine(s) 216. Other engine(s) 216 can implement functionalities that supplement applications or functions performed by network security platform 230 or processing engine(s) 208.

In an example, processing engine(s) 258 can include a static analysis engine 262, a dynamic analysis engine 264, and other engine(s) 266. Other engine(s) 266 can implement functionalities that supplement applications or functions performed by endpoint device 280 or processing engine 258. As noted above, depending upon the particular implementation, dynamic analysis may be performed local to the endpoint device 280 or in the cloud. As such, in alternative embodiments, dynamic analysis engine 264 may be implemented in network security platform 230 in the form of a cloud-based sandbox service, for example.

According to an embodiment, information engine 212 maintains information regarding a static analysis threshold that specifies a threshold for a particular process to be considered malicious when compared to a particular score assigned to the particular process as a result of performing static file analysis on files associated with the particular process. Information engine 212 also maintains a mapping of behaviors to corresponding weighting factors, where the weighting factors are indicative of a significance of the corresponding behavior to an inference of malicious intent.

According to an embodiment, in response to an attempt to execute a process on endpoint device 280 and prior to permitting execution of the process on endpoint device 280, static analysis engine 262 generates a static analysis score by performing a machine-learning based static file analysis on files associated with the process. When the static analysis score meets or exceeds the static analysis threshold, then decision engine 214 classifies the process as malicious and causes static analysis engine 262 to block execution of the process.

Conversely, when the static analysis score is less than the static analysis threshold, then dynamic analysis engine 264 generates a dynamic analysis score for the process by observing behaviors resulting from execution of the files by endpoint device in real-time 280 and determining the corresponding weighting factors of the observed behaviors based on the mapping maintained by information engine 212.

Finally, decision engine 214 classifies the process as malicious based on a function of the static analysis score and the dynamic analysis score and consequently causes dynamic analysis engine 264 to block the execution of the process.

The processing described with reference to FIGS. 3-5 below may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by a combination of one or more computer systems in physical or virtual form, such as computer system 600 described with reference to FIG. 6.

Figure 3:
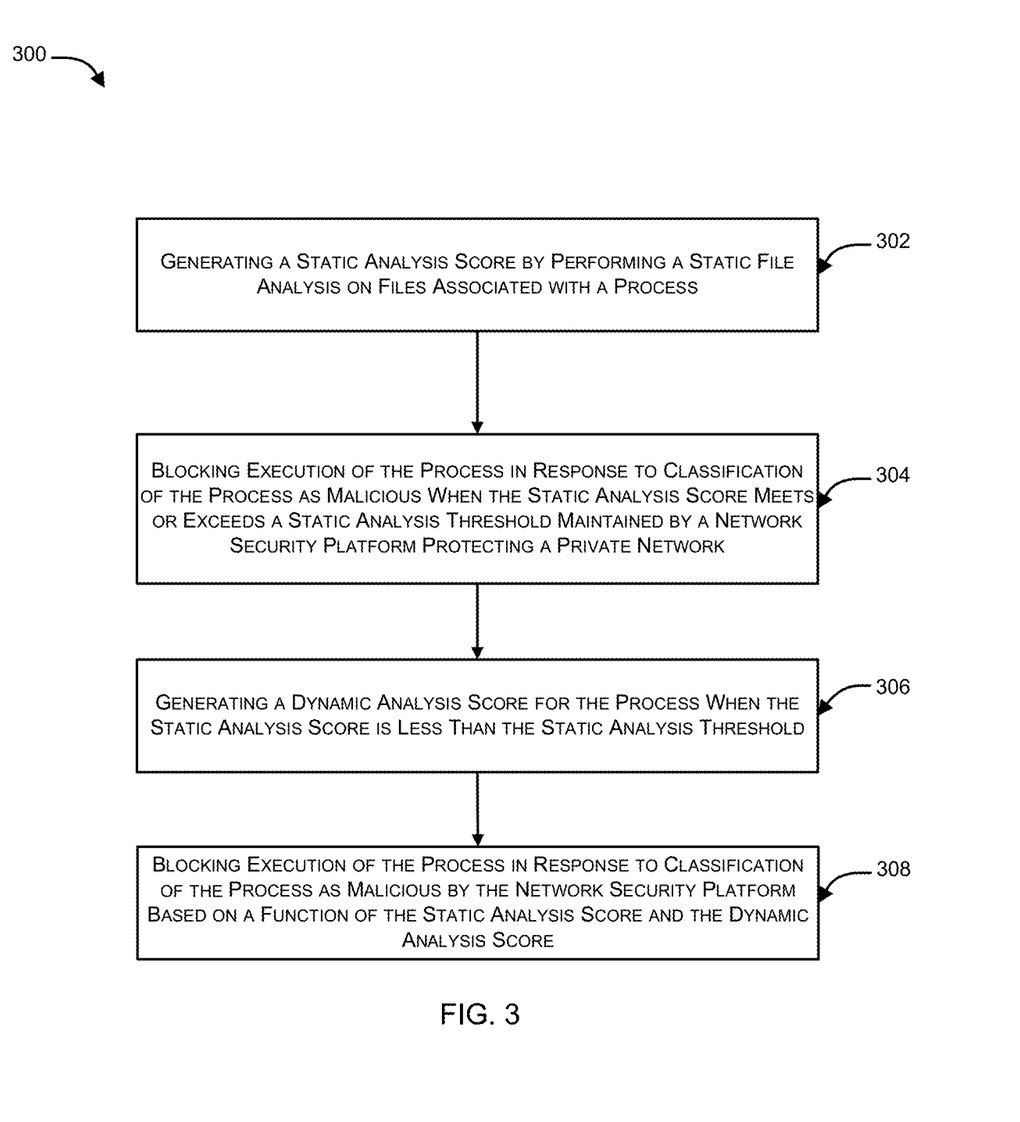
FIG. 3 is a flow diagram illustrating a process performed at an endpoint device in accordance with an embodiment of the present invention.

FIG. 3 is a flow diagram 300 illustrating a process performed at an endpoint device in accordance with an embodiment of the present invention. In the context of the present example, in response to an attempt to execute a process on an endpoint device and prior to permitting execution of the process on the endpoint device, at block 302, an endpoint security solution running on the endpoint device generates a static analysis score by performing a static file analysis on one or more files associated with the process. In some embodiments, the endpoint security solution determines all files associated with a particular process that is being attempted to be launched on the endpoint device.

At block 304, the endpoint security solution blocks execution of the process in response to classification of the process as malicious when the static analysis score meets or exceeds a static analysis threshold maintained by a network security platform protecting a private network.

At 306, the endpoint security solution generates a dynamic analysis score for the process when the static analysis score is less than the static analysis threshold. In one embodiment, the dynamic analysis score is generated by observing behaviors resulting from execution of the files by the endpoint device and determining the corresponding weighting factors of the observed behaviors based on mapping of the behaviors to corresponding weighting factors maintained by the network security platform. In other embodiment, the dynamic analysis score may be obtained by the endpoint security solution requesting analysis of the file by a cloud-based sandboxing service.

At block 308, the endpoint security solution blocks execution of the process in response to classification of the process as malicious by the network security platform based on a function of the static analysis score and the dynamic analysis score.

Figure 4:
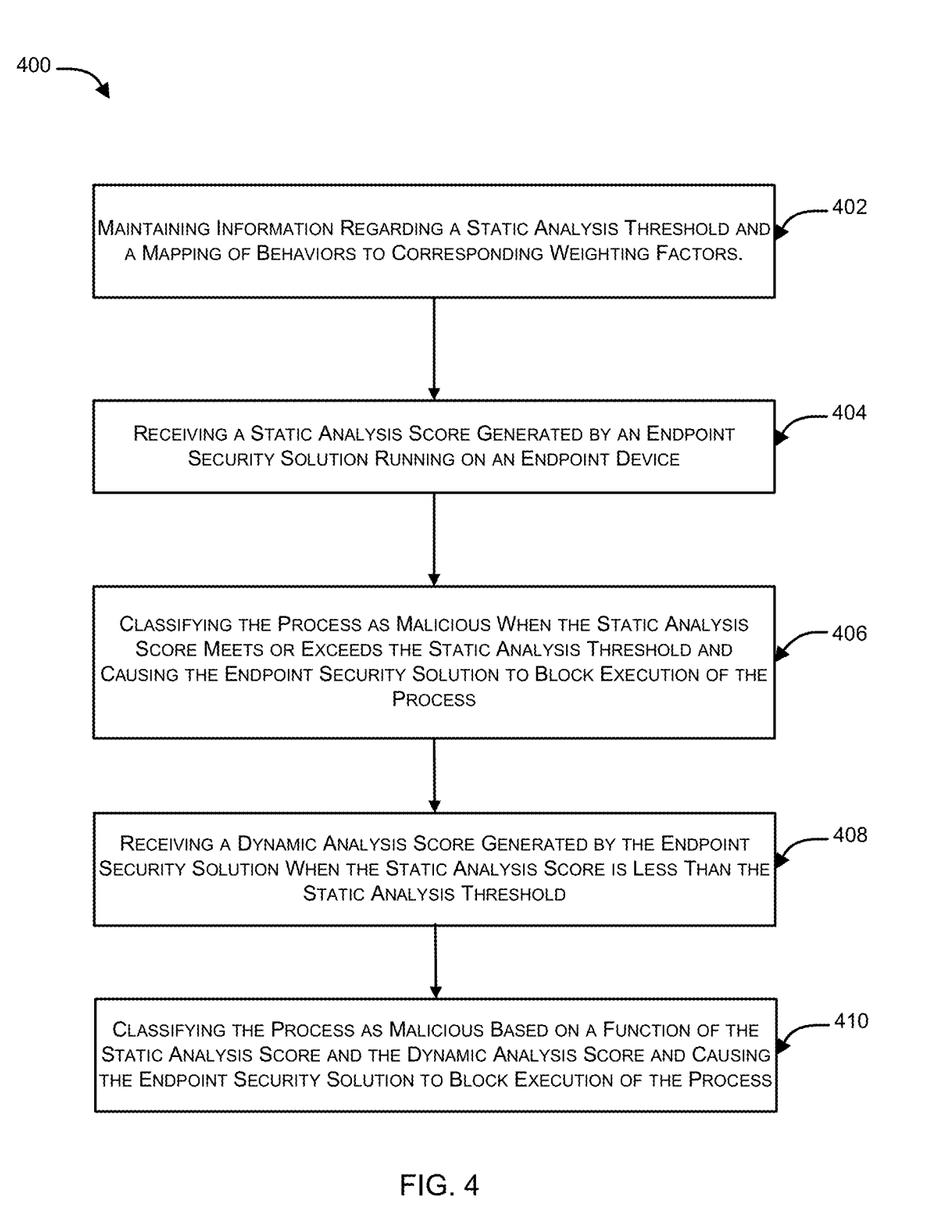
FIG. 4 is a flow diagram illustrating a process performed at a network security platform in accordance with an embodiment of the present invention.

FIG. 4 is a flow diagram 400 illustrating a process performed at a network security platform in accordance with an embodiment of the present invention. In the context of the present example, at block 402 a network security platform protecting a private network, maintains information regarding a static analysis threshold and a mapping of behaviors to corresponding weighting factors.

At block 404, the network security platform receives a static analysis score generated by an endpoint security solution running on an endpoint device. The endpoint security solution generates the static analysis score by performing a static file analysis files associated with a process prior to permitting execution of the process on the endpoint device.

At block 404, the network security platform classifies the process as malicious when the static analysis score meets or exceeds the static analysis threshold and causes the endpoint security solution to block execution of the process.

At block 406, the network security platform receives a dynamic analysis score generated by the endpoint security solution when the static analysis score is less than the static analysis threshold. The endpoint security solution generates the dynamic analysis score for the process by observing behaviors resulting from execution of the files by the endpoint device and determining the corresponding weighting factors of the observed behaviors based on the mapping maintained by the network security platform. In an alternative embodiments, the dynamic analysis score may be generated by a third-party sandbox service or a cloud-based sandbox service associated with the network security platform at the cost of interrupting the user.

At block 410, the network security platform classifies the process as malicious based on a function of the static analysis score and the dynamic analysis score and causes the endpoint security solution to block execution of the process.

Figure 5:
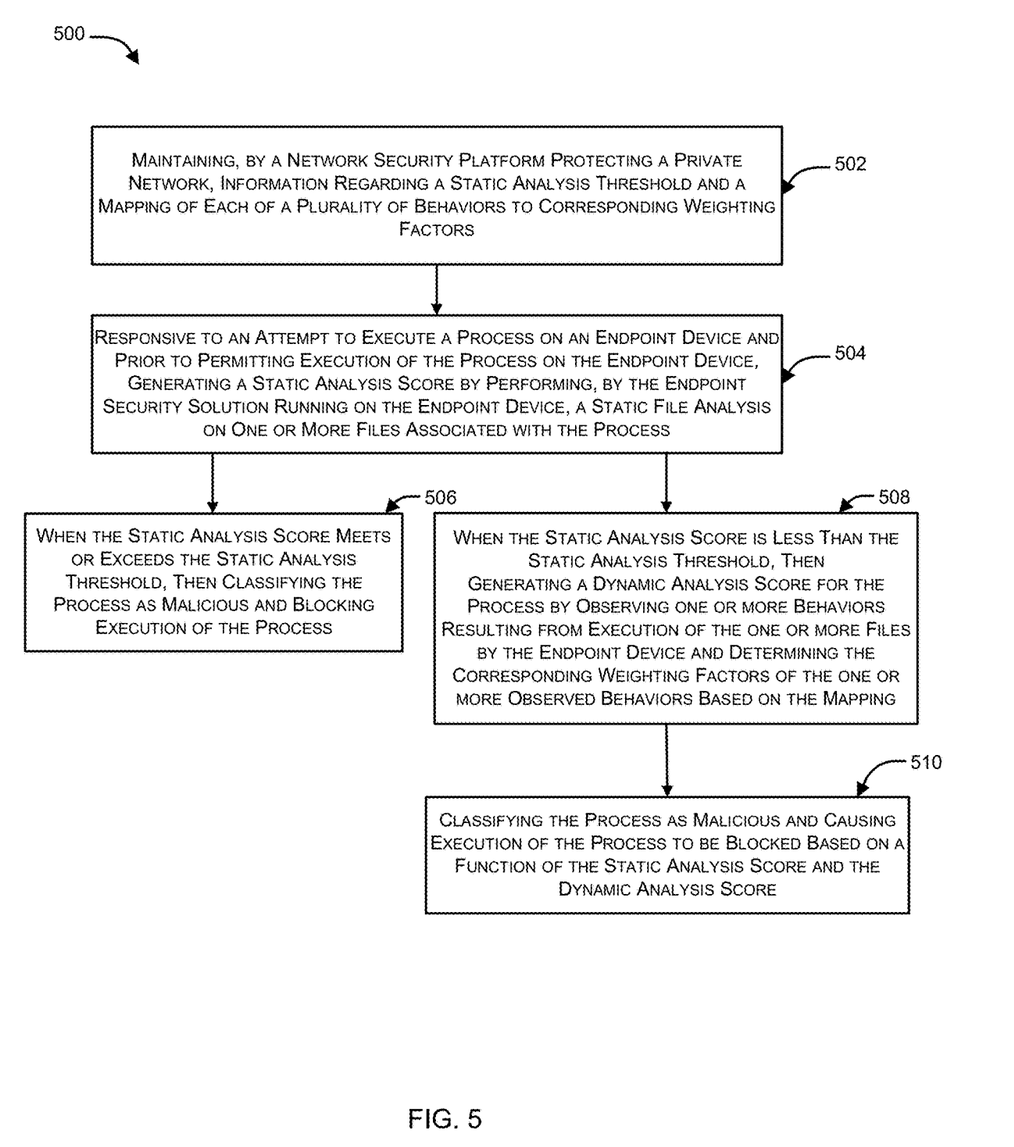
FIG. 5 is a flow diagram illustrating a process performed by a network security platform and an endpoint device in combination in accordance with an embodiment of the present invention.

FIG. 5 is a flow diagram 500 illustrating a process performed by a network security platform and an endpoint device in combination in accordance with an embodiment of the present invention. In the context of the present example, at block 502 a network security platform protecting a private network, maintains information regarding a static analysis threshold and a mapping of behaviors to corresponding weighting factors. The static analysis threshold specifies a threshold for a particular process to be considered malicious when compared to a particular score assigned to a particular process as a result of performing static file analysis on files associated with the particular process, and the weighting factors are indicative of a significance of the corresponding behavior to an inference of malicious intent.

In response to an attempt to execute a process on an endpoint device and prior to permitting execution of the process on the endpoint device, at block 504 an endpoint security solution running on the endpoint device generates a static analysis score by performing a static file analysis on files associated with the process.

When the static analysis score meets or exceeds the static analysis threshold, at block 506, the network security platform classifies the process as malicious and causes the endpoint security solution to block execution of the process.

When the static analysis score is less than the static analysis threshold, at block 508, the endpoint security solution obtains a dynamic analysis score for the file/process at issue. For example, the endpoint security solution may locally determine a dynamic analysis score for the process by observing behaviors resulting from execution of the files by the endpoint device and determines the corresponding weighting factors of the observed behaviors based on the mapping. *Further, at block 510**, the network security platform classifies the process as malicious based on a function of the static analysis score and the dynamic analysis score and causes the endpoint security solution to block execution of the process.

Figure 6:
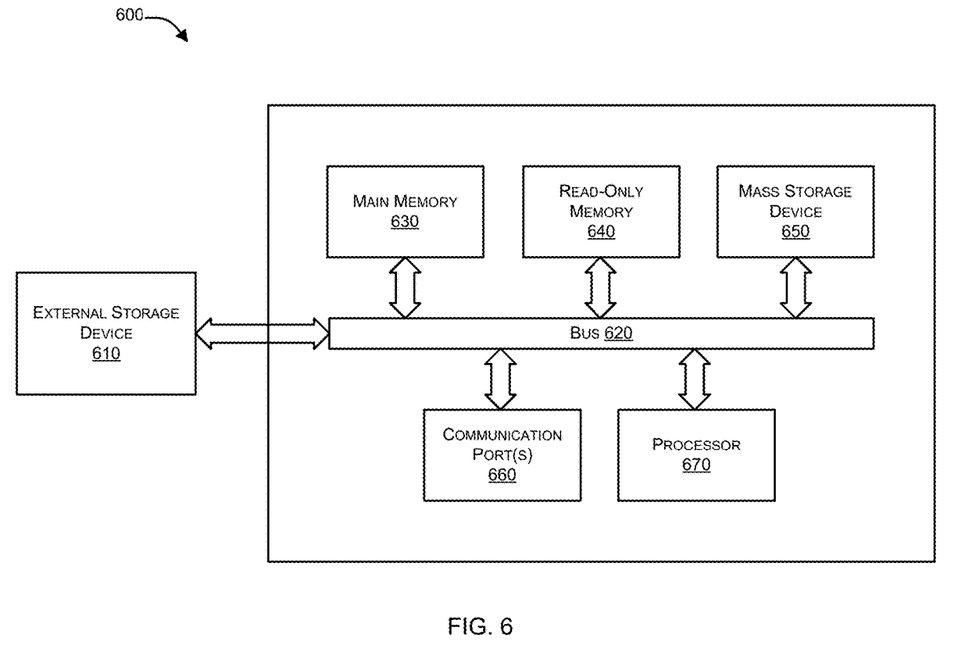
FIG. 6 illustrates an exemplary computer system in which or with which embodiments of the present invention may be utilized.

FIG. 6 illustrates an exemplary computer system 600 in which or with which embodiments of the present invention may be utilized. For example, computer system 600 may represent a portion of a cloud-based network security service (e.g., network security platform 110), an endpoint device (e.g., endpoint device 106) or a server within a cloud-based security service. While various examples described herein are described with reference to physical computer systems, those skilled in the art will appreciate the functionality and methodologies described herein are equally applicable to computing environments (e.g., a data center or cloud) in which functionality is deployed on virtual machines or as a service in the context of a container, a pod, or other virtualized environment. Furthermore, while in some embodiments, the various data feeds discussed herein have been described with reference to various security event classification services, it is to be appreciated that one or more of the various security event classification sources may be network security devices represented in virtual or physical form.

As shown in FIG. 6, computer system 600, includes an external storage device 610, a bus 620, a main memory 630, a read only memory 640, a mass storage device 650, a communication port 660, and a processor 670.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
maintaining, by a network security platform protecting a private network, information regarding a static analysis threshold and a mapping of each of a plurality of behaviors to corresponding weighting factors, wherein the network security platform includes an endpoint security solution, wherein the static analysis threshold specifies a threshold for a particular process to be considered malicious when compared to a particular score assigned to the particular process as a result of performing static file analysis on one or more files associated with the particular process, and wherein the weighting factors are indicative of a significance of the corresponding behavior of the plurality of behaviors to an inference of malicious intent;
responsive to an attempt to execute a process on an endpoint device and prior to permitting execution of the process on the endpoint device, generating a static analysis score by performing, by the endpoint security solution running on the endpoint device, a static file analysis on one or more files associated with the process;
when the static analysis score meets or exceeds the static analysis threshold, then treating the process as malicious and blocking execution of the process;
observing, by the endpoint security solution, one or more behaviors resulting from execution of the process by the endpoint device;
calculating, by the endpoint security solution, a dynamic analysis score for the process based at least in part on the one or more behaviors;
when the static analysis score is less than the static analysis threshold:
obtaining the dynamic analysis score for the process from the endpoint security solution; and
treating the process as malicious and causing execution of the process to be blocked based on a function of the static analysis score and the dynamic analysis score.

2. The method of claim 1, wherein said calculating the dynamic analysis score based at least in part on the one or more behaviors includes determining the corresponding weighting factors of the one or more observed behaviors based on the mapping.

3. The method of claim 1, wherein the network security platform includes a cloud-based security service in which a sandbox service resides and wherein said obtaining a dynamic analysis score for the process comprises the endpoint security solution requesting analysis of the one or more files by the sandbox service.

4. The method of claim 1, wherein when the static file analysis comprises a machine-learning based static file analysis.

5. The method of claim 1, wherein the one or more observed behaviors are determined by the network security platform based on contextual information of the process.

6. The method of claim 5, wherein the contextual information includes any or a combination of a command line instruction to execute the process, a process execution chain of the process, a memory dump associated with the process, and a plurality of environment variables.

7. The method of claim 1, wherein when the process is determined to be malicious, the network security platform takes at least one or a plurality of actions.

8. The method of claim 7, wherein the plurality of actions include any or a combination of notifying a user associated with the process, isolating the endpoint device associated with the process and quarantine the process.

9. A non-transitory computer-readable storage medium embodying a set of instructions, which when executed by one or more processing resources associated with a network security platform protecting a private network, causes the one or more processing resources to perform a method comprising:
maintaining, by the network security platform, information regarding a static analysis threshold and a mapping of each of a plurality of behaviors to corresponding weighting factors, wherein the network security platform includes an endpoint security solution, wherein the static analysis threshold specifies a threshold for a particular process to be considered malicious when compared to a particular score assigned to the particular process as a result of performing static file analysis on one or more files associated with the particular process, and wherein the weighting factors are indicative of a significance of the corresponding behavior of the plurality of behaviors to an inference of malicious intent;

responsive to an attempt to execute a process on an endpoint device and prior to permitting execution of the process on the endpoint device, generating a static analysis score by performing, by the endpoint security solution running on the endpoint device, a static file analysis on one or more files associated with the process;

when the static analysis score meets or exceeds the static analysis threshold, then treating the process as malicious and blocking execution of the process;

observing, by the endpoint security solution running on the endpoint device, one or more behaviors resulting from execution of the process by the endpoint device;

calculating, by the endpoint security solution running on the endpoint device, a dynamic analysis score for the process based at least in part on the one or more behaviors;

when the static analysis score is less than the static analysis threshold:
- obtaining the dynamic analysis score for the process from the endpoint security solution running on the endpoint device; and
- treating the process as malicious and causing execution of the process to be blocked based on a function of the static analysis score and the dynamic analysis score.

10. The non-transitory computer-readable storage medium of claim 9, wherein calculating the dynamic analysis score based at least in part on the one or more behaviors includes determining the corresponding weighting factors of the one or more observed behaviors based on the mapping.

11. The non-transitory computer-readable storage medium of claim 9, wherein the network security platform includes a cloud-based security service in which a sandbox service resides and wherein said obtaining a dynamic analysis score for the process comprises the endpoint security solution requesting analysis of the one or more files by the sandbox service.

12. The non-transitory computer-readable storage medium claim 9, wherein when the static file analysis comprises a machine-learning based static file analysis.

13. The non-transitory computer-readable storage medium of claim 9, wherein the one or more observed behaviors are determined by the network security platform based on contextual information of the process.

14. The non-transitory computer-readable storage medium of claim 12, wherein the contextual information includes any or a combination of a command line instruction to execute the process, a process execution chain of the process, a memory dump associated with the process, and a plurality of environment variables.

15. The non-transitory computer-readable storage medium of claim 13, wherein when the process is determined to be malicious, the network security platform takes at least one or a plurality of actions.

16. The non-transitory computer-readable storage medium of claim 14, wherein the plurality of actions include any or a combination of notifying a user associated with the process, isolating the endpoint device associated with the process and quarantine the process.

17. A synergistic system for detecting malicious behavior, the system comprising:
- a first processor included in a network security platform;
- a first non-transitory computer readable medium coupled to the first processor;
- a second processor included in an endpoint device;
- a second non-transitory computer readable medium coupled to the second processor;
- wherein the first non-transitory computer readable medium includes information regarding a static analysis threshold and a mapping of each of a plurality of behaviors to corresponding weighting factors; wherein the static analysis threshold specifies a threshold for a particular process to be considered malicious when compared to a particular score assigned to the particular process as a result of performing static file analysis on one or more files associated with the particular process, and wherein the weighting factors are indicative of a significance of the corresponding behavior of the plurality of behaviors to an inference of malicious intent;
- wherein the second non-transitory computer readable medium embodies instructions which when executed by the second processor cause the first processor to:
  - prior to permitting execution of a process on the endpoint device, generating a static analysis score by performing a static file analysis on one or more files associated with the process;
  - block execution of the process when the static analysis score exceeds the static analysis threshold;
  - execute the process when the static analysis is less than the static analysis threshold;
  - observe one or more behaviors resulting from execution of the process by the endpoint device; and
  - calculate a dynamic analysis score for the process based at least in part on the one or more behaviors; and
- wherein the first non-transitory computer readable medium embodies instructions which when executed by the first processor cause the first processor to:
  - obtain the dynamic analysis score for the process from the endpoint security solution running on the endpoint device; and
  - treat the process as malicious and causing execution of the process to be blocked based on a function of the static analysis score and the dynamic analysis score.

18. The system of claim 17, wherein calculating the dynamic analysis score based at least in part on the one or more behaviors includes determining the corresponding weighting factors of the one or more observed behaviors based on the mapping.

19. The system of claim 17, wherein the network security platform includes a cloud-based security service in which a sandbox service resides and wherein said obtaining a dynamic analysis score for the process comprises the endpoint security solution requesting analysis of the one or more files by the sandbox service.

20. The system of claim 17, wherein when the static file analysis comprises a machine-learning based static file analysis.

* * * * *